United States Patent Office 3,644,290
Patented Feb. 22, 1972

3,644,290
ELASTIC MOULDING COMPOSITIONS OF POLYACETALS AND PROCESS FOR THEIR MANUFACTURE
Karl-Heinz Häfner, Bad Orb, and Harald Cherdron, Wiesbaden, Germany, assignors to Farbwerke Hoechst Aktiengesellschaft vormals Meister Lucius & Bruning, Frankfurt am Main, Germany
No Drawing. Filed Dec. 2, 1968, Ser. No. 780,568
Claims priority, application Germany, Dec. 8, 1967,
F 54,257
Int. Cl. C08g 22/14
U.S. Cl. 260—67 TN      4 Claims

ABSTRACT OF THE DISCLOSURE

Elastic moulding compositions on the basis of polyacetals are prepared by reacting copolymers of trioxane containing free amino groups with polyethers containing isocyanate groups. The elastic moulding compositions so obtained are thermoplastic and distinguished by high impact strength and are used alone or in admixture with polyacetals to form shaped particles.

---

The present invention relates to elastic moulding compositions and a process for their manufacture. It has been described in German Pats. 838,826 and 831,604 to react polyesters containing terminal isocyanate groups with diamines. German Pat. 953,116 describes the reaction of toluylene - 2,4 - di-isocyanate with 3,3' - dichlorobenzidine or with bis[3-chloro-4-amino-phenyl]-methane by which rubberelastic plastics are obtained.

The present invention provides a process for the manufacture of elastic moulding compositions of polyacetals wherein copolymers of trioxane containing free amino groups are reacted at temperatures within the range of from 50 to 230° C. with an amount at most equivalent to the free amino groups of the polyacetal of a polyether containing isocyanate groups.

Suitable copolymers of trioxane containing amino groups may be obtained in known ways by polymerization of mixtures of from 60 to 99.99% by weight of trioxane, 0.01 to 30% by weight of cyclic ethers or cyclic acetals containing nitro groups and 0 to 20% by weight of cyclic ethers or cyclic acetals and by following reduction of the copolymers containing nitro groups. Suitable reducing agents are for example molecular hydrogen in the presence of traces of palladium, platinum or Raney nickel, or hydrogen sulfide in the presence of ammonia, or hydrazine hydrate in the presence of ammonia or sodium dithionite, or sodium sulfide in the presence of piperidine. The reduction temperature is within the range of from 50 to 170° C. The reduction may be carried out in suspension as well as in solution. Suitable dispersing agents are for example alcohols or chlorinated hydrocarbons. Suitable solvents are for example benzyl alcohol, ethyldiglycol or o-dichlorobenzene.

As cyclic ethers or cyclic acetals containing nitro groups there are preferably used compounds of the general Formula I $$R_1\text{—}R_2\text{—}(NO_2)_n \qquad (I)$$

in which $R_1$ stands for a 2,3-epoxy-propyloxy- or 1,3-dioxolano-4-methoxy radical, $R_2$ stands for a bivalent aromatic hydrocarbon radical with 6 or 10 carbon atoms in the ring which may be substituted by $(A)_x$ and/or $(B)_y$, A being an alkyl radical with 1 to 6, preferably 1 to 3, carbon atoms, B being an alkoxy radical with 1 to 6, preferably 1 to 3, carbon atoms, $x$ and $y$ each being a whole number from 0 to 4 and $x+y$ being smaller than 5, and $n$ stands for a whole number from 1 to 3.

Suitable nitro compounds are for example
o-, m- or p-glycideoxy-nitro-benzene,
1-glycideoxy-2,4-dinitrobenzene,
1-glycideoxy-2,4,6-trinitro-benzene,
p-[1,3-dioxolano-4-methyloxy]-nitrobenzene,
1-glycideoxy-4-nitronaphthalene,
1-glycideoxy-2,4-dinitronaphthalene,
1-glycideoxy-2-methyl-4-nitrobenzene or
1-glycideoxy-2-methoxy-4-nitrobenzene.

Cyclic ethers and cyclic acetals are compounds of the general Formula II

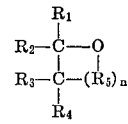

in which the radicals $R_1$ to $R_4$ are identical or different and stand for hydrogen atoms alkyl or radicals or halogen substituted alkyl radicals and $R_5$ stands for a methylene or oxymethylene radical which may be substituted by alkyl or halo-alkyl radicals, $n$ being a whole number from 0 to 3, or $R_5$ stands for the radical $$\text{—}(O\text{—}CH_2\text{—}CH_2)_m\text{—}OCH_2\text{—}$$

$n$ being 1 and $m$ being a whole number from 1 to 3. The above mentioned alkyl radicals contain 1 to 5 carbon atoms and may be substituted by 1 to 3 halogen atoms, preferably chlorine atoms. There are preferably used cyclic ethers with 3 to 5 ring members, especially epoxides, as well as cyclic acetals with 5 to 11, preferably 5 to 8 ring members, especially cyclic formals of $\alpha,\omega$-diols with 2 to 8, preferably 2 to 4 carbon atoms, the carbon chain of which may be interrupted at intervals of 2 carbon atoms by an oxygen atom.

As cyclic ethers there may preferably be used ethylene oxide as well as propylene oxide and epichlorhydrine. Glycol formal and diglycol formal as well as 4-chloromethyl-dioxolane are suitable cyclic acetals.

Suitable polyethers containing isocyanate groups are compounds of the general Formula III or IV (III)      $R(CO\text{—}NH\text{—}R'\text{—}NCO)_2$ (IV)

$$OCN\text{—}R'\text{—}NH\text{—}CO\text{—}R\text{—}CY\text{—}(CH_2)_{1-3}\text{—}R\text{—}CO\text{—}NH\text{—}R'\text{—}NCO$$
$$\qquad\qquad\qquad\qquad |$$
$$\qquad\qquad\quad (CH_2)_{1-3}\text{—}R\text{—}CO\text{—}NH\text{—}R'\text{—}NCO$$

in which R stands for the radical

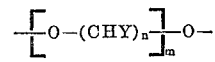

Y being hydrogen atoms or alkyl groups with 1 to 3 carbon atoms, $n$ being a whole number from 2 to 4 and $m$ being a whole number from 1 to 2500, preferably 4 to 500, and R' stands for a linear or branched alkylene radical with 2 to 18, preferably 4 to 12 carbon atoms, or a bivalent cycloaliphatic radical with 6 to 12 carbon atoms or a bivalent aromatic hydrocarbon radical with 6 or 10 carbon atoms in the ring which may be substituted by $(A)_x$, A being an alkyl radical with 1 to 3 carbon atoms and $x$ a whole number from 0 to 4.

Suitable polyethers containing isocyanate groups are obtained by known processes by partially reacting polyethers, containing 2 or 3 terminal OH groups with di-isocyanates in a manner such that only one isocyanate group respectively reacts with one OH group.

Polyethers of a molecular weight within the range of from 100 to 50,000, preferably 200 to 25,000 suitable for the reaction with di-isocyanates are for example polyethyleneglycols, polypropane diols, polybutane diols, polytetrahydrofurane, polypropylene glycols, branched polyethers, which are derived for example from glycerol, as well as mixed polyethers from ethylene glycol and propylene glycol.

The reaction between polyacetals containing amino groups and polyethers containing isocyanate groups may be carried out in solution, in suspension or in the melt.

Suitable solvents are inert, polar organic solvents, for example 1,4-dioxane, chlorobenzene, o-dichlorobenzene, butyrolactone, dimethyl formamide and 1,1,2,2-tetrachloroethane.

Suitable dispersing agents are inert, aliphatic aromatic or cycloaliphatic hydrocarbons with 6 to 18 carbon atoms, for example n-hexane, cyclohexane or toluene.

The reaction is carried out at temperatures within the range of from 50 to 230° C. The temperature of the solutions is preferably within the range of from 70 to 170° C., that of suspensions from 50 to 170° C. and that of the melt from 130 to 230° C.

It is advantageous to work in the presence of catalysts known in themselves in order to accelerate the reaction. Suitable catalysts are for example tertiary aliphatic or aromatic amines, for example tributyl amine, pyridine, N-methyl morpholine and triethylene diamine, in amounts of from 0.01 to 2% by weight, preferably 0.05 to 1.0% by weight, calculated on the total reaction mixture.

The polyethers containing isocyanate groups are advantageously present in an amount at most equivalent to the free amino groups of the polyacetal; amounts equivalent to from 40 to 80% of the amino groups are preferably used.

After the reaction has been terminated the polymer which has been cooled is ground for elimination of the tertiary amine, if the reaction has been carried out in the melt, and boiled with methanol or acetone until free from amine. If the reaction has been carried out in solution the precipitation of the polymer is completed after cooling by addition of methanol, the polymer is suction filtered and freed from residual amine by boiling with methanol. If the reaction has been carried out in suspension the polymer is suction filtered and washed with methanol or acetone until free from amine.

The decrease of the free amino groups of the starting polymer after reaction with polyethers containing isocyanate groups has been demonstrated in the infrared spectrum.

By the process in accordance with the invention elastic moulding compositions are obtained which can be processed in the thermoplastic range for example by extrusion, pressure moulding or casting into shaped articles such as plates, sheets or films, for example, to be employed for a variety of technical applications. The products of the invention are of high impact strength and are excellent compounding materials to be added to polyacetals in order to improve the impact strength of the latter.

For example, the starting terpolymer of 60 grams of trioxane, 30 grams of dioxolane and 10 grams of 2,4-dinitroglycideoxybenzene containing 1.78% $NH_2$ groups after reduction, cannot be drawn off as a continuous plate from an aluminum foil after compression moulding at 190° C. because of too much brittleness, but after reaction with polyethers containing isocyanate groups elastic compressed plates are obtained which can be drawn off without difficulty from an aluminum foil after compression moulding.

The following examples serve to illustrate the invention, but are not intended to limit it.

EXAMPLE 1

50 grams terpolymer A (from 60 grams of trioxane, 30 grams of dioxolane and 10 grams of 2,4-dinitroglycideoxybenzene which contained 1.78% $NH_2$ groups after reduction), 28 grams of a polyether, synthetized from polyglycol MW 2000 and toluylene-2,4-diisocyanate, and 0.5 gram of triethylene diamine were boiled under reflux for 2 hours in 500 milliliters of 1,4-dioxane. After cooling the polymer was poured into methanol while stirring. After suction-filtration the polymer obtained was boiled with methanol, suction-filtered and dried.

Yield: 63 grams
Softening point: about 190° C.
Reduced specific viscosity $\eta_{red}$: 1.06 dl./g.
Characteristic values of the terpolymer A:
  Softening point: about 135° C.
  Reduced specific viscosity $\eta_{red}$: 0.24 dl./g.

The softening points were determined on a Kofler bank. Determination of the reduced specific viscosity $\eta_{red}$: 50 milligrams of the polymer were dissolved at 140° C. in 10 milliliters of butyrolactone which contained 2% diphenylamine and the viscosity was measured at this temperature.

The term "polyglycol MW 2000" is used herein to mean a polyglycol having a molecular weight of about 2000.

Compressed plates prepared at 190° C. of the terpolymer were brittle whereas products correspondingly prepared of the reaction product of terpolymer A and polyether (polyglycol MW 2000 and toluylene-2,4-diisocyanate) were elastic.

In a manner analogous to Example 1 the following tests were carried out starting from 50 grams of terpolymer A, respectively:

| Ex. | Polyether with terminal isocyanate groups obtained from | Amount [g.] | Yield [g.] | Softening points [° C.] | Red [dl./g.] |
|---|---|---|---|---|---|
| 2 | Polyethylene glycol MW 2000 and toluylene-2,4-diisocyanate | 93 | 60 | ca. 200 | (1) |
| 3 | Polyethylene glycol MW 700 and toluylene-2,4-diisocyanate | 11 | 40 | ca. 230 | 0.79 |
| 4 | Polyethylene glycol MW 700 and toluylene-2,4-diisocyanate | 17 | 54 | ca. 230 | 0.56 |
| 5 | Polypropylene oxide MW 4000 and toluylene-2,4-diisocyanate | 32 | 64 | ca. 200 | (1) |
| 6 | Polytetrahydrofurane MW 1000 and toluylene-2,4-diisocyanate | 69 | 62 | ca. 190 | (1) |
| 7 | Polyethylene glycol MW 2000 and hexane-1,6-diisocyanate | 93 | 56 | ca. 190 | 0.55 |
| 8 | Branched polyglycol MW 2500 and toluylene-2,4-diisocyanate | 76 | 84 | ca. 200 | (1) |

[1] Not measurable; too viscous.

EXAMPLE 9

50 grams of terpolymer B (from 88 grams of trioxane, 2 grams of ethylene oxide and 20 grams of p-glycideoxynitrobenzene, which contained 0.95% of $NH_2$ groups after reduction) were kneaded with 30 grams of a polyether which had been synthetized from polyethylene glycol MW 2000 and toluylene-2,4-diisocyanate, and 0.5 gram of tributylamine for 30 minutes at 180° C. The reaction product so obtained was ground after cooling and boiled with methanol. The residue was filtered off and dried.

Yield: 68 grams
Softening point: about 190° C.
Reduced specific viscosity $\eta_{red}$: 1.15 dl./g.

What is claimed is:
1. A process for making elastic polyacetals having improved impact strength which comprises reacting an acetal polymer having free amino groups with a polyether hav- ing isocyanate groups and selected from the general formula:

$$R(CO-NH-R'-NCO)_2$$

or $$OCH-R'-NH-CO-R-CY-(CH_2)_{1-3}-R-CO-NH-R'-NCO$$
$$\phantom{OCH-R'-NH-CO-R-CY}|$$
$$\phantom{OCH-R'-NH-CO-R-}(CH_2)_{1-3}-R-CO-NH-R'-NCO$$

in which R is the radical $$-\left[O-(CHY)_n\right]_m-O-$$

Y is hydrogen or an alkyl group with 1 to 3 carbon atoms, $n$ is 2 to 4, $m$ is 1 to 2500, and R' is a linear or branched alkylene radical with 2 to 18 carbon atoms, or a bivalent cycloaliphatic radical with 6 to 12 carbon atoms or a bivalent aromatic hydrocarbon radical with 6 or 10 carbon atoms in the ring which may be substituted by $(A)_x$, A being an alkyl radical with 1 to 3 carbon atoms and $x$ being 0 to 4, at a temperature of 50° to 230° C., said polyacetal polymer being the reaction product of 60% to 99.99% by weight of trioxane, 0 to 20% of an oxygen-containing cyclic acetal or ether and 0.01 to 30% by weight of a compound of the formula $$R_1-R_2-(NO_2)_n$$

in which $R_1$ is 2,3-epoxy-propyloxy or 1,3-dioxolano-4-methoxy radical, $R_2$ is a bivalent aromatic hydrocarbon radical with 6 or 10 carbon atoms in the ring which may be substituted by $(A)_x$ and/or $(B)_y$, A being an alkyl radical with 1 to 6 carbon atoms, B being an alkoxy radical with 1 to 6 carbon atoms, $x$ and $y$ each being 0 to 4 and $x+y$ being smaller than 5, and $n$ is 1 to 3, with the nitro groups thereof reduced to amine groups, the proportions of polyacetal polymer and polyether being such that the isocyanate groups of the polyether are equivalent to 40% to 80% of the amino groups of the polyacetal.

2. A process according to claim 1 wherein the reaction is carried out in the presence of an inert polar solvent.

3. A process according to claim 1 wherein the polyether having free isocyanate groups is the reaction product of an organic diisocyanate and a polyether having two or three terminal hydroxyl groups and a molecular weight 200 to 25,000.

4. An elastic polyacetal made by the process of claim 1.

References Cited

UNITED STATES PATENTS

| 2,929,800 | 3/1960 | Hill | 260—77.5 |
| 3,147,234 | 9/1964 | Polly | 260—67 |
| 3,248,373 | 4/1966 | Barringer | 260—77.5 |
| 3,275,604 | 9/1966 | Kray et al. | 260—67 |
| 3,425,992 | 2/1969 | Yamauchi et al. | 260—67 |

WILLIAM H. SHORT, Primary Examiner

L. M. PHYNES, Assistant Examiner

U.S. Cl. X.R.

260—67 A, 77.5 AM, 77.5 AQ